United States Patent
Huynh

(10) Patent No.: US 9,402,450 B2
(45) Date of Patent: Aug. 2, 2016

(54) INVISIBLE SETTING AND METHODS AND TOOLS FOR EFFECTING SAME

(75) Inventor: Khanh Tan Huynh, Ashwood (AU)

(73) Assignee: Grand Rainbow International Limited, Causeway Bay (HK)

( * ) Notice: Subject to any disclaimer, the term of this patent is extended or adjusted under 35 U.S.C. 154(b) by 110 days.

(21) Appl. No.: 13/461,860

(22) Filed: May 2, 2012

(65) Prior Publication Data

US 2013/0291587 A1    Nov. 7, 2013

(51) Int. Cl.
    *A44C 17/02*    (2006.01)
    *A44C 17/04*    (2006.01)
    *B23P 5/00*    (2006.01)
    *A44C 17/00*    (2006.01)

(52) U.S. Cl.
    CPC . *A44C 17/04* (2013.01); *B23P 5/00* (2013.01); *A44C 17/005* (2013.01); *A44C 17/0216* (2013.01); *A44C 17/046* (2013.01); *Y10T 29/23* (2015.01)

(58) Field of Classification Search
    USPC ............................................................. 63/26
    See application file for complete search history.

(56) References Cited

U.S. PATENT DOCUMENTS

| | | | |
|---|---|---|---|
| 664,725 A | | 12/1900 | Costigan |
| 1,864,371 A | * | 6/1932 | Prussian ........................ 63/29.1 |
| 2,141,363 A | * | 12/1938 | Rigollet ........................ 63/29.1 |
| 3,483,716 A | * | 12/1969 | Stenzler ........................... 63/15 |
| 3,853,416 A | | 12/1974 | Hanan |
| 4,800,738 A | | 1/1989 | Bunz |
| 4,835,987 A | | 6/1989 | Magnien et al. |
| 5,072,601 A | | 12/1991 | Slowinski |
| 5,115,649 A | | 5/1992 | Amber |
| 5,123,265 A | | 6/1992 | Ramot |
| D337,741 S | | 7/1993 | Garfolo |
| D337,964 S | | 8/1993 | Garfolo |
| 5,423,196 A | | 6/1995 | Pollack |
| 5,437,167 A | * | 8/1995 | Ambar ............................. 63/26 |
| 5,713,219 A | | 2/1998 | Itzkowitz |
| 6,112,552 A | * | 9/2000 | Hoffman ........................ 63/26 |
| 6,568,213 B2 | | 5/2003 | Butler |
| 6,598,277 B1 | | 7/2003 | Schecter |
| D509,766 S | | 9/2005 | Aghjayan et al. |
| D514,011 S | | 1/2006 | Aghjayan et al. |
| D537,012 S | | 2/2007 | Aghjayan et al. |

(Continued)

FOREIGN PATENT DOCUMENTS

| | | |
|---|---|---|
| CH | 634475 | 2/1983 |
| CN | 1777374 | 5/2006 |

(Continued)

OTHER PUBLICATIONS

Letter About Patentability Search Invisible Setting and Methods and Tools for Effecting Same Dated Feb. 12, 2012 From Attorney (Sol).

(Continued)

*Primary Examiner* — Jack W Lavinder

(57) ABSTRACT

A mounting holds a grooved gemstone invisibly to a setting. One end of the mounting has arms or extensions to receive the gemstone and protrusions extending inwardly from the arms to fit in the grooves of the gemstone, the mounting further comprising a holding configuration for holding the mounting to the setting. Insertion of the mounting into the setting may in one version distort the holding configuration and levers the arms to press harder into the groove.

28 Claims, 15 Drawing Sheets

(56) References Cited

U.S. PATENT DOCUMENTS

| 8,096,146 | B1 | 1/2012 | Adlakha |
|---|---|---|---|
| 2002/0050551 | A1 | 5/2002 | Yamada et al. |
| 2003/0056536 | A1 | 3/2003 | Ubhayakar |
| 2015/0121959 | A1 | 5/2015 | Huynh |

FOREIGN PATENT DOCUMENTS

| CN | 101972069 | | 2/2011 |
|---|---|---|---|
| DE | 202009005519 | | 8/2009 |
| EP | 1321063 | | 6/2003 |
| FR | 833234 | | 10/1938 |
| FR | 835817 | | 1/1939 |
| FR | 2836341 | A1 * | 8/2003 |
| FR | 2839247 | | 11/2003 |
| GB | 454821 | | 10/1936 |
| GB | 491074 | | 8/1938 |
| GB | 826492 | | 1/1960 |
| JP | 0433202 | | 6/1992 |
| JP | 4170142 | | 10/2008 |
| JP | 2011-036315 | | 2/2011 |
| WO | WO 01/70067 | | 9/2001 |
| WO | WO 2013/164771 | | 11/2013 |
| WO | WO 2015/056146 | | 4/2015 |

OTHER PUBLICATIONS

International Search Report and the Written Opinion Dated Sep. 26, 2013 From the International Searching Authority Re. Application No. PCT/IB2013/053442.
Restriction Official Action Dated May 14, 2014 From the US Patent and Trademark Office Re. U.S. Appl. No. 29/419,806.
Official Action Dated Jul. 30, 2014 From the US Patent and Trademark Office Re. U.S. Appl. No. 29/419,806.
International Search Report and the Written Opinion Dated Mar. 4, 2015 From the International Searching Authority Re. Application No. PCT/IB2014/065256.
Notification of Office Action and Search Report Dated Sep. 2, 2015 From the State Intellectual Property Office of the People's Republic of China Re. Application No. 201380023148.0 and Its Translation Into English.
Supplementary European Search Report and the European Search Opinion Dated Sep. 9, 2015 From the European Patent Office Re. Application No. 13784406.4.
Written Opinion Dated Jul. 31, 2015 From the Intellectual Property Office of Singapore Re. Application No. 11201407095V.
Notification of Office Action Dated Mar. 18, 2016 From the State Intellectual Property Office of the People's Republic of China Re. Application No. 201380023148.0 and Its Translation Into English.
Patent Examination Report Dated Mar. 31, 2016 From the Australian Government, IP Australia Re. Application No. 2013255439.
International Preliminary Report on Patentability Dated Apr. 28, 2016 From the International Bureau of WIPO Re. Application No. PCT/IB2014/065256.
Written Opinion Dated May 12, 2016 From the Intellectual Property Office of Singapore Re. Application No. 11201407095V.
International Preliminary Report on Patentability Dated Nov. 13, 2014 From the International Bureau of WIPO Re. Application No. PCT/IB2013/053442.

* cited by examiner

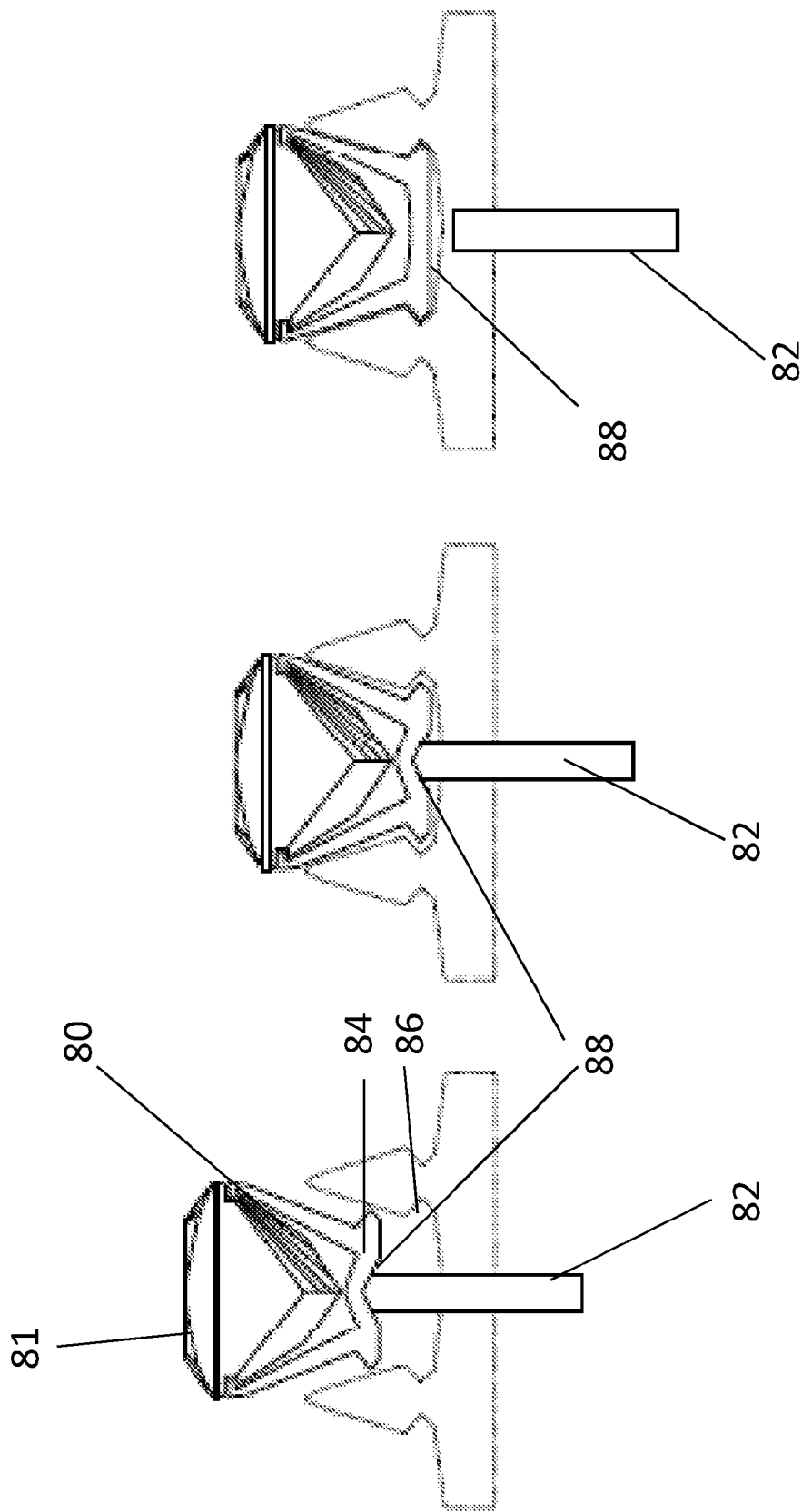

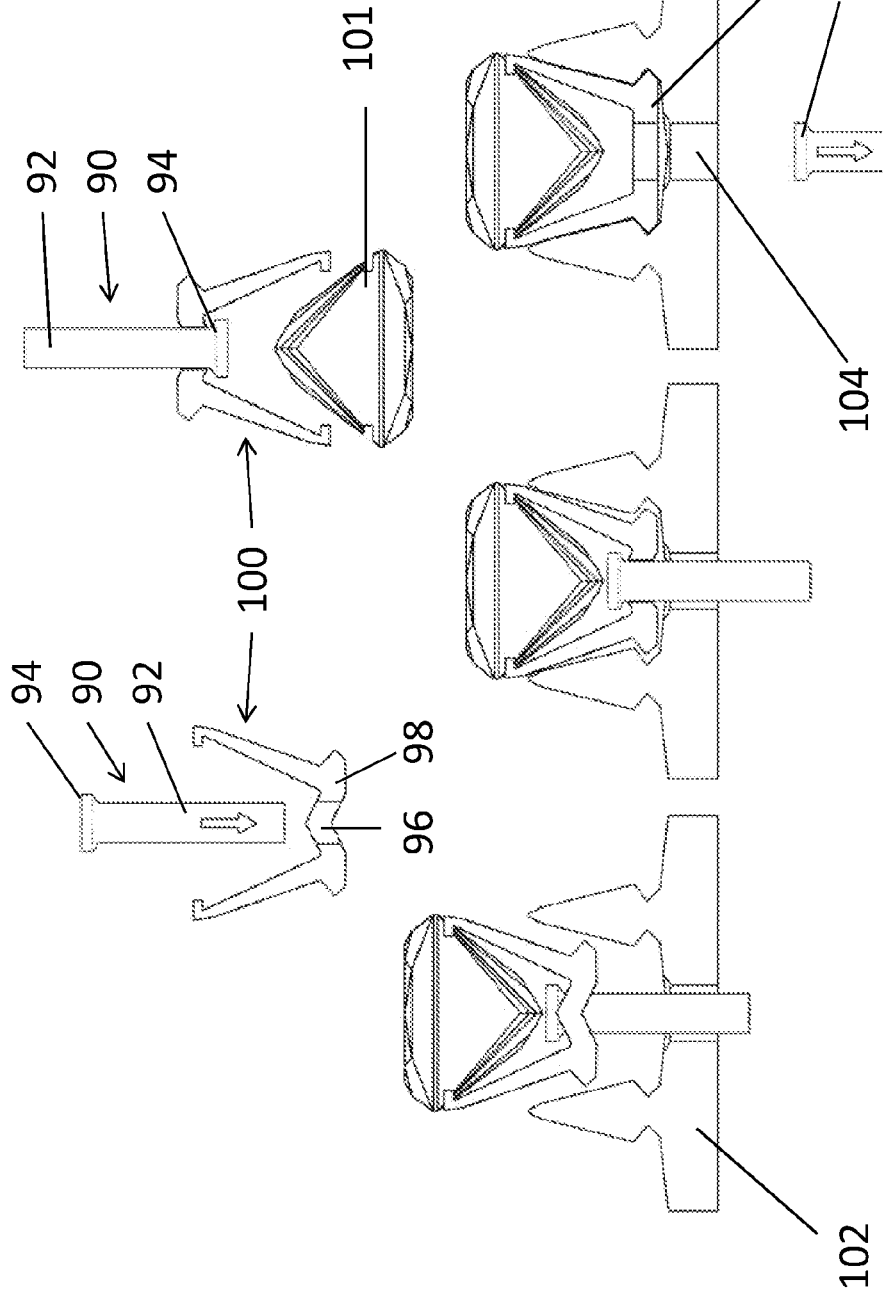

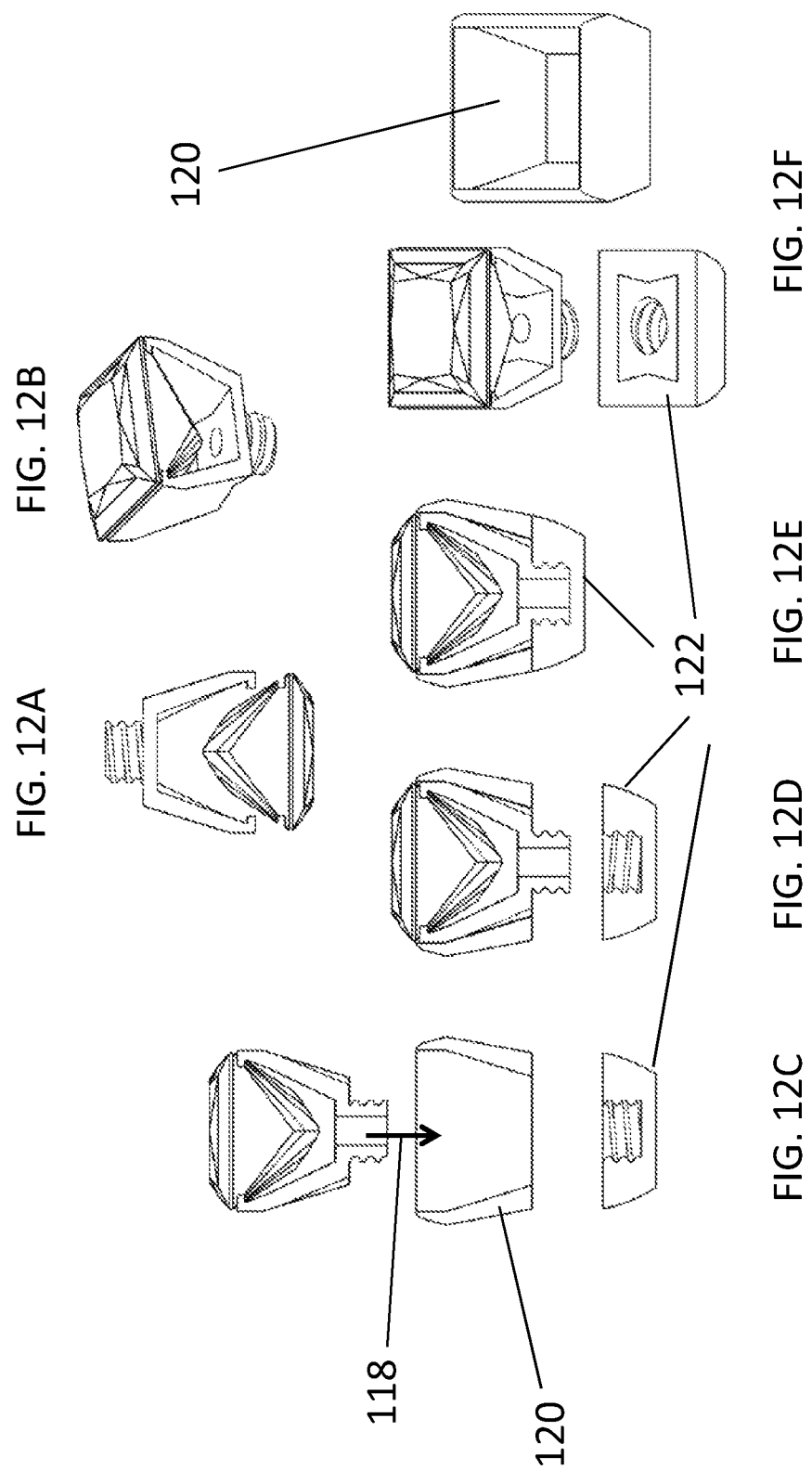

INVISIBLE SETTING AND METHODS AND TOOLS FOR EFFECTING SAME

FIELD AND BACKGROUND OF THE INVENTION

The present invention, in some embodiments thereof, relates to an invisible setting for diamonds and other precious stones that are faceted, and methods and tools for effecting such settings.

Invisible settings have been around for many years and have been very successful. The traditional invisible mounting involves fitting a protrusion of the setting, or mounting medium into a groove in the stone. The groove is hidden behind the face of the stone, hence hiding the mounting. The setting or mounting medium may be the metal body of the ring or other jewelry item.

A well-known problem with invisible mountings is the ease with which the stone is able to fall out of the mounting. The setting can often change shape over time. The finger on which the ring is mounted may change shape over time, or the metal may expand or contract with changes in temperature, so that what began as a tight fit may get looser over time until the stone falls out. Where multiple stones are mounted in a row, if the setting bends in a particular direction all of the stones are liable to fall out.

A further issue with invisible settings is the time and skilled labor required to set the stone, or replace the stone after it falls out. A tight fit is required by making a secure mounting at a location that cannot be seen, and the stones themselves are generally quite small. Setting a single stone typically takes in excess of twenty minutes in the hands of a skilled setter.

U.S. Pat. No. 6,112,552 teaches an invisible gemstone setting having channels into which the grooved gemstones are snapped and secured. Each channel is provided with opposing flexible prong members extending from the base of the gemstone setting. As the grooved gemstones are snapped into the channels the prong members flex outwardly as the gemstones are pushed downwards into the channels. The prong members snap into engagement with the gemstones to securely hold the gemstones within the channels. When the channels are filled the setting becomes invisible.

Again, the gemstone is more easily mounted but the same problem arises that if the setting changes shape, the initially firm grip on the gemstone is liable to be lost.

SUMMARY OF THE INVENTION

The present embodiments provide a separate mounting for holding the grooved gemstone, which separate mounting is held within but is not part of the gemstone setting. Thus changes in shape in the setting have no bearing on how firmly the gemstone is held. The jewelry setting no longer needs to include the protrusion for fitting into the gemstone groove, as this is now part of the separate mounting. Instead however the setting may incorporate hollows or openings for holding the mountings.

According to an aspect of some embodiments of the present invention there is provided a mounting for holding a grooved gemstone invisibly to a setting, the mounting having a first end with extensions to receive the gemstone and protrusions extending inwardly from the extensions to fit within respective mounting grooves of the grooved gemstone, the mounting further comprising a holding configuration for lockingly holding the mounting to the setting.

The holding configuration may be designed to undergo distortion when fitting into the setting, the distortion being for the purpose of lockingly holding the particular mounting to the setting.

In an embodiment, the holding configuration is connected to the extensions to press the protrusions inwardly onto the groove when the holding configuration is distorted against contouring of the setting.

In an embodiment, the mounting is configured to be deformed upon pulling inwardly about contouring on the setting, the deformation being such as to lever the extensions to push the protrusion inwardly into the groove.

In an embodiment, the holding configuration is configured to protrude at least partially from a base part of the setting, the holding configuration being deformable about the setting by a deformation tool applied to the second end to catch the mounting into the setting and to lever the protrusions into the groove.

In an embodiment, the holding configuration is configured to protrude at least partially from a base part of the setting, the holding configuration comprising a breakable portion that deforms the mounting prior to being broken away therefrom, to catch the mounting into the setting and to lever the protrusions into the groove.

In an embodiment, the breakable portion is designed to be broken off using a shaped mounting tool.

The holding configuration may include a weakened portion for preferential deformation when being mounted.

The mounting may simultaneously close over the grooved gemstone and deform into the setting with a single application of force.

The mounting may include a concave base portion flattenable to provide the deformation.

Flattening may be provided by a breakable portion attached to the base portion.

Flattening may be provided by a tool inserted via a hole into the base portion, or the tool may be a threaded tool designed to thread around a screw end at the base, or the tool may be an insertion tool that forces the base to open along a weakening or gap. The mounting extensions may be resilient.

According to a second aspect of the present embodiments a setting for gemstones may be provided which comprises a plurality of locations for holding respective gemstone mountings, each location being shaped to close upper protrusions of the mounting into a groove of a grooved gemstone to hold the gemstone to the setting. The closing may be achieved by deforming the respective mounting as it is pressed into position in the setting.

In an embodiment, the setting may be contoured to push upper parts of respective mountings inwardly to lock onto the groove when the setting is pushed downwardly into the location.

The respective shapes built into the setting may be open at a lower end to allow a deformable or breakable holding portion of the mounting to extend from the lower end for the deformation or breakage causing the deformation.

The setting may be provided with a tool to carry out the deformation or breakage causing the deformation.

According to a third aspect of the present invention there is provided a method of mounting a grooved gemstone to a setting comprising:

providing a setting having a mounting location, providing a mounting, the mounting having arms and protrusions at a distal end of the arms to fit into grooves of the grooved gemstone, pressing the mounting into the mounting space, the pressing causing contouring on the mounting location to press the arms inwardly to lock the protrusions into the grooves, thereby mounting the gemstone.

The method of the present embodiments may be carried out by a robot arm.

According to a fourth aspect of the present invention there is provided a mounting for invisible placing of a grooved gemstone within a setting, the mounting being separate and distinct from both the setting and the gemstone and having both a setting attachment for attachment to the setting and a gemstone attachment for attaching a gemstone.

According to a fifth aspect of the present invention there is provided a method of mounting a flawed gemstone to a setting comprising:

providing a gemstone having grooves and flaws in proximity to the grooves;

providing a setting having a mounting space, providing a mounting, the mounting having arms and protrusions at a distal end of the arms to fit into grooves of the grooved gemstone, pressing the mounting into the mounting space, the pressing causing contouring on the mounting space to press the arms inwardly to lock the protrusions into the grooves, thereby mounting the gemstone via inward pressure on a body of the gemstone and not relying on structural resilience of the flaws.

The flaw may be an inclusion and typically causes structural weakening.

According to a sixth aspect of the present invention there is provided a gemstone cut with grooves dedicated for invisible setting, the gemstone having an inclusion causing structural weakening of the gemstone, the inclusion being in close proximity to one of the grooves, the inclusion weakening the gemstone in the close proximity of the grooves, making the gemstone more likely to chip as compared to a gemstone having an otherwise similar, but more centered, inclusion.

According to a seventh aspect of the present invention there is provided an item of jewelry comprising a setting, a plurality of mountings for mounting gemstones and a plurality of gemstones mounted on the plurality of mountings and invisibly mounted on the setting, whereby the setting and the plurality of mountings are made of different materials.

According to an eighth aspect of the present invention there is provided an item of jewelry comprising a setting and a plurality of mountings, each mounting for holding a grooved gemstone invisibly to the setting, respective mountings having a first end with extensions to receive a respective gemstone and protrusions extending inwardly from the extensions to fit within corresponding mounting grooves of the grooved gemstone, each mounting further comprising a holding configuration configured to undergo distortion when fitting into the setting, the distortion lockingly holding the respective mounting to the setting.

According to a ninth aspect of the present invention there is provided a method of mounting a grooved gemstone to a setting comprising:

pressing said gemstone into a mounting to locate grooves of said gemstone into protrusions of said mounting, and inserting said mounting into said setting.

According to a tenth aspect of the present invention there is provided a mounting for holding a grooved gemstone invisibly to a setting, the mounting having a first end with extensions to receive the gemstone and protrusions extending inwardly from said extensions to fit within respective mounting grooves of the grooved gemstone, the mounting further comprising a holding configuration to insert said mounting into a location in said setting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 8A-8D are simplified diagrams illustrating an embodiment of a mounting in which a breakable end is used to straighten a concave base to fix the mounting into the setting;

FIGS. 9A-9F are a series of simplified diagrams illustrating the use of a removable tool to straighten a concave base to fix the mounting into the setting;

FIGS. 12A-12F illustrate succeeding stages in mounting and clasping a gemstone into the mounting of FIG. 10.

DESCRIPTION OF SPECIFIC EMBODIMENTS OF THE INVENTION

Figure 1A:
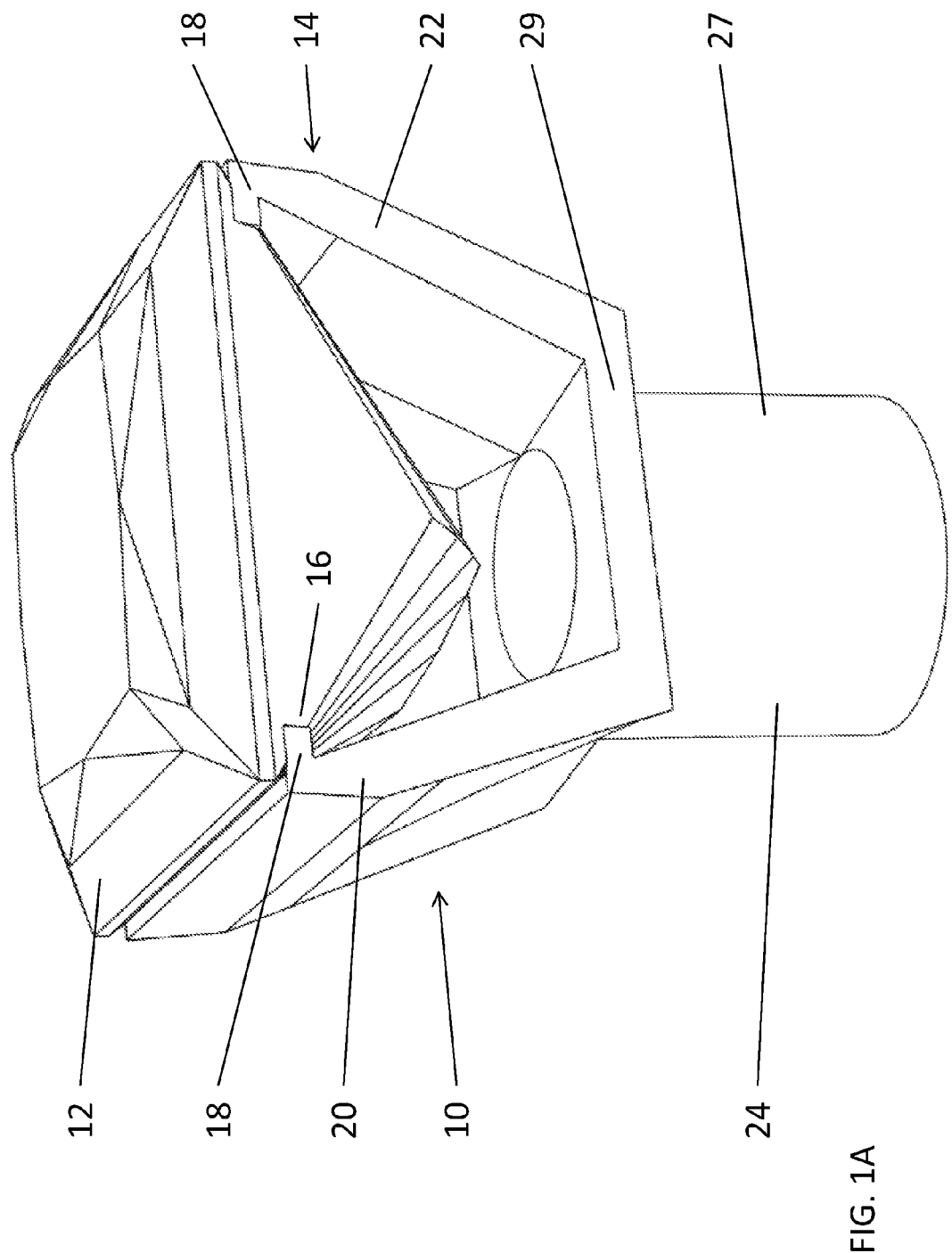
FIG. 1A is a simplified schematic diagram showing a mounting according to an embodiment of the present invention holding a gemstone.

The present invention, in some embodiments thereof, relates to an invisible setting for diamonds and other precious stones in jewelry, and methods and tools for effecting such settings. In the present embodiments a mounting is used to hold the gemstone within the setting, so that the process of fixing the gemstone in position is made easier and so that distortions to the setting over time do not affect the integrity of the way in which the gemstone is held.

In the present disclosure the term "gemstone" is used to refer not only to diamonds and other precious and semiprecious stones, but also to glass, metals, plastic and anything else that can be made into a decorative mounting for jewelry and like products.

In addition to jewelry, the embodiments may be applied to mounting of gemstones as defined above, on fashion bags, directly on clothing, on personal articles such as watches, mobile telephones etc, on other consumer articles and also to mounting on vehicles or parts of vehicles and onto buildings and parts of buildings.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1A shows a mounting 10 which holds a grooved gemstone 12 invisibly to a setting such as a ring or other item of jewelry. The mounting 10 has a first end 14 designed to hold the gemstone 12 at groove 16 using protrusions 18 of two oppositely facing arms 20 and 22. The protrusions 18 extend inwardly from the arms 20 and 22 to fit the groove. The mounting 10 further has a holder 24 for holding the mounting to the setting.

Figure 1B:
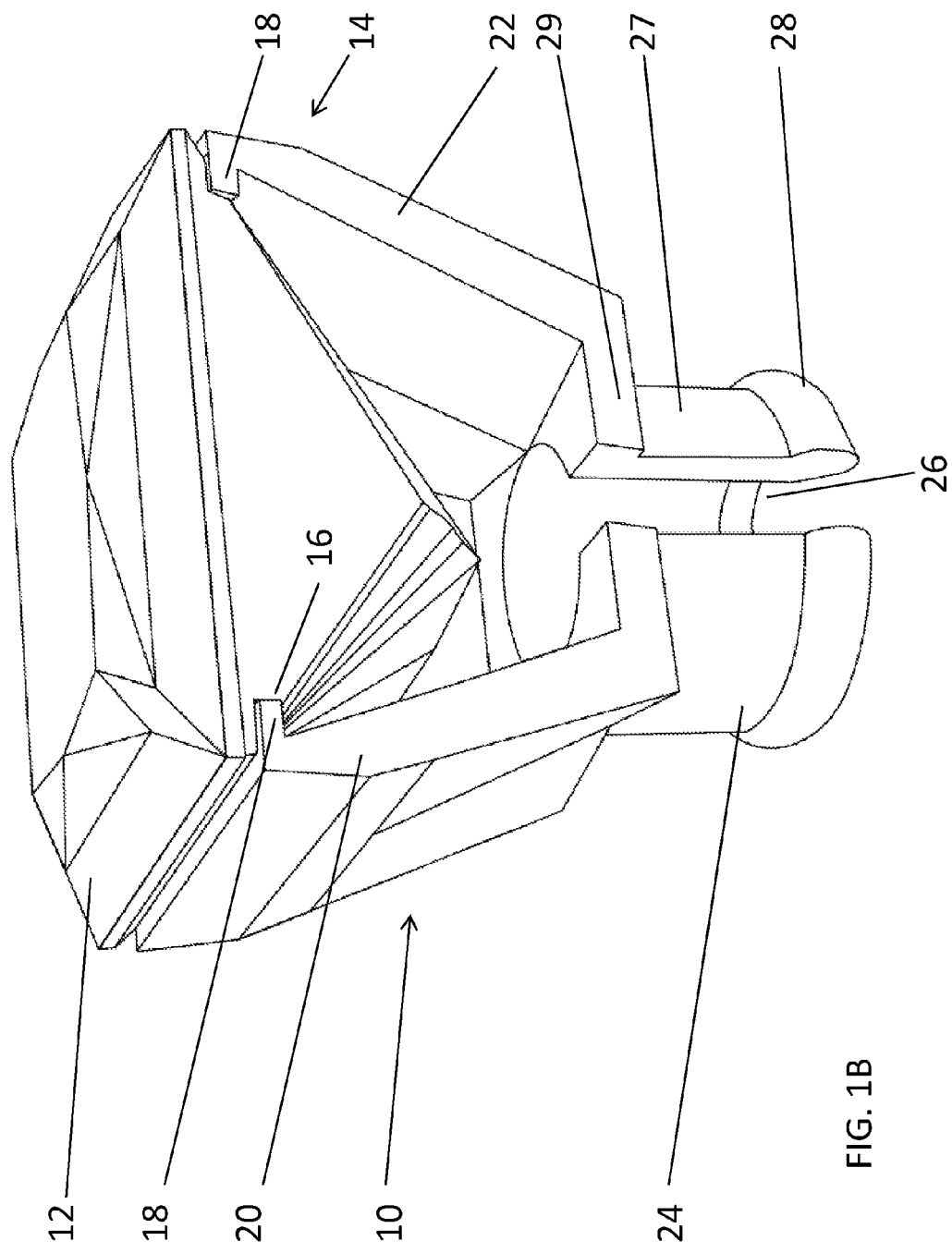
FIG. 1B is a variation of the mounting of FIG. 1A.

FIG. 1B likewise has a mounting for fitting gemstones. However a gap 26 in the base of the mounting provides snap-on functionality for the mounting, as will be described in greater detail below.

Figure 2A:
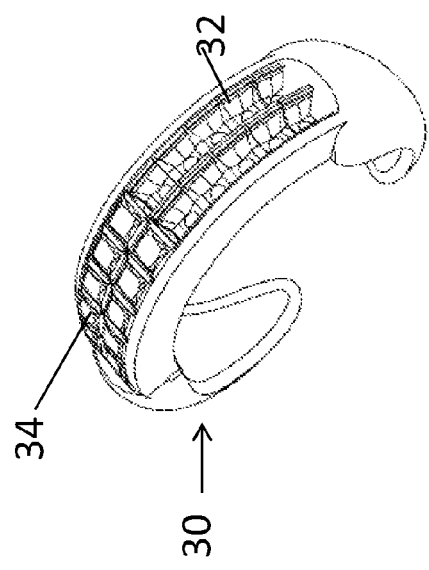
FIGS. 2A-2C are views from different angles of a setting designed with spaces to accept mountings according to FIG. 1.
Figure 2B:
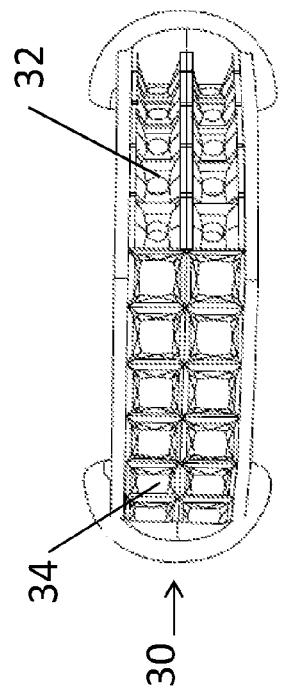
Figure 2C:
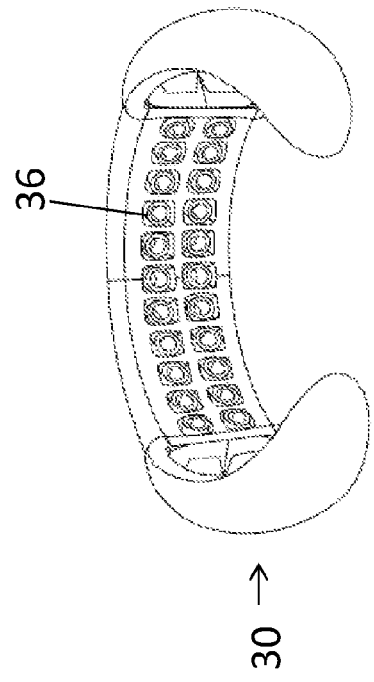

Reference is now made to FIGS. 2A to 2C, which show different views of a setting 30 having spaces 32 for placing the gemstones in the mountings. Some of the spaces are shown filled with already mounted gemstones 34.

FIG. 2A shows a perspective view of the setting. FIG. 2B shows a view from above and FIG. 2C shows a view from below. As seen in FIG. 2C the spaces 32 extend to openings 36 in the underside of the setting through which the holders 24 may poke through during the mounting process, as will be explained hereinbelow.

Reference is now made to FIG. 3, which shows in greater detail how the mounting 10 with the gemstone 12 held in its arms is mounted within one of spaces 32 to the setting 30. The mounting is snapped into the space 32 so that holder 24 extends outwardly from opening 36. The walls of holder 24 are then deformed outwardly around the opening. The deformation has the effect of jamming the mounting into the space, but also presses the walls of the mounting against the convex contouring 42 of the space so that the convex contouring levers the arms 20 and 22 to press into grooves 16 of the gemstone.

That is to say, the setting comprises spaces for holding mountings. Each space is shaped with a bulge or contoured, to hold the mounting and at the same time deform the mounting to close the arms into the gemstone groove. In other words, the space is contoured to lock the mounting into the setting and at the same time push the arms or upper parts of the mountings inwardly to lock onto the gemstone groove when the setting is pushed downwardly into the space, as discussed.

Returning to FIG. 1B, and the mounting, and more specifically, the holder 24, is designed to be deformed when pulled into the setting. The holder 24 is hollow, and has an open slit 26 down one side. Furthermore the cylindrical outer walls 27 of the holder are relatively thin along their length in between base 28 and the meeting point 29 with the arms. The relatively thin walls combined with the open slit provide a relatively weakened portion of the mounting to provide for controlled deformation, allowing a specifically desired deformation to be preferentially caused by the mounting.

Figure 3A:
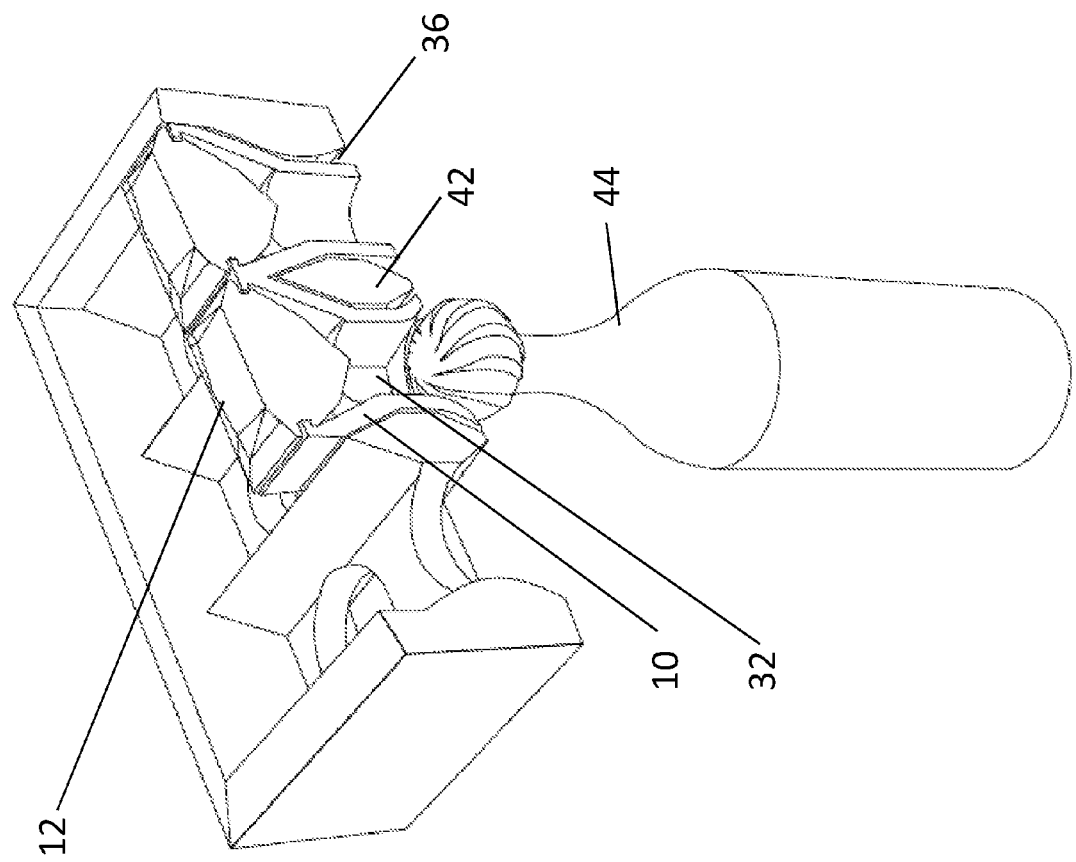
FIG. 3A is a simplified diagram showing a mounting according to FIG. 1 being fixed into position in the setting of FIG. 2 using a deformation tool.

As shown in FIG. 3A, the deformation may be carried out by a beveling tool 44 or the like. Beveling of the base 28 of the holder 24, as discussed, causes the arms 20 and 22 to close over the gemstone and hold the gemstone more strongly via the groove.

Figure 3B:
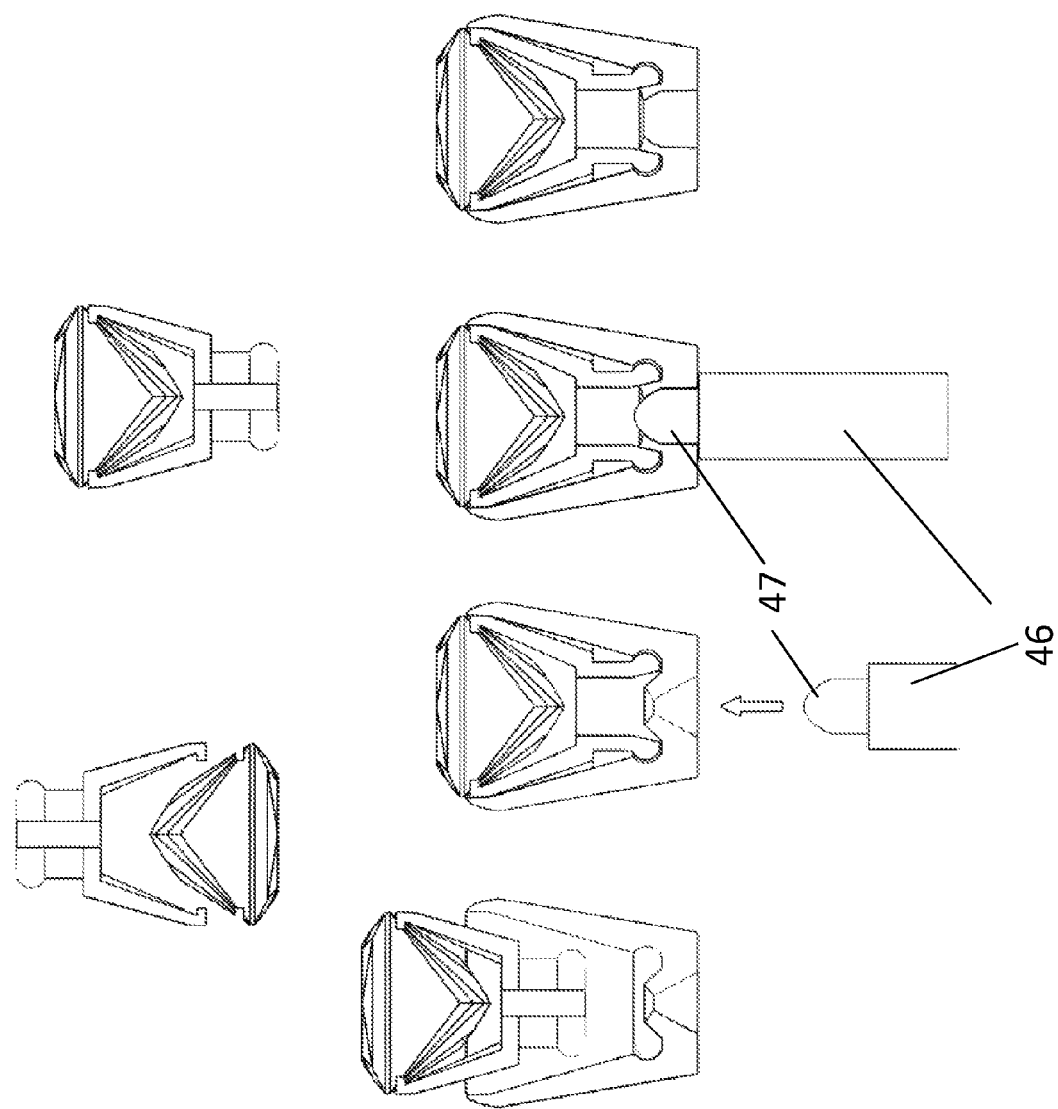
FIG. 3B is a simplified diagram showing a mounting according to FIG. 1B being fixed into position in the setting of FIG. 2 using another deformation tool.

FIG. 3B shows the use of an equivalent tool for the embodiment of FIG. 1B. In the embodiment of FIG. 1B the base is flexible because of gap 26 which is constructed therein. Tool 46 comprises a head 47 which is inserted into the base of the mounting to force the two sides of the mounting apart and thus allow the gemstone to be snapped into place.

Figure 4:
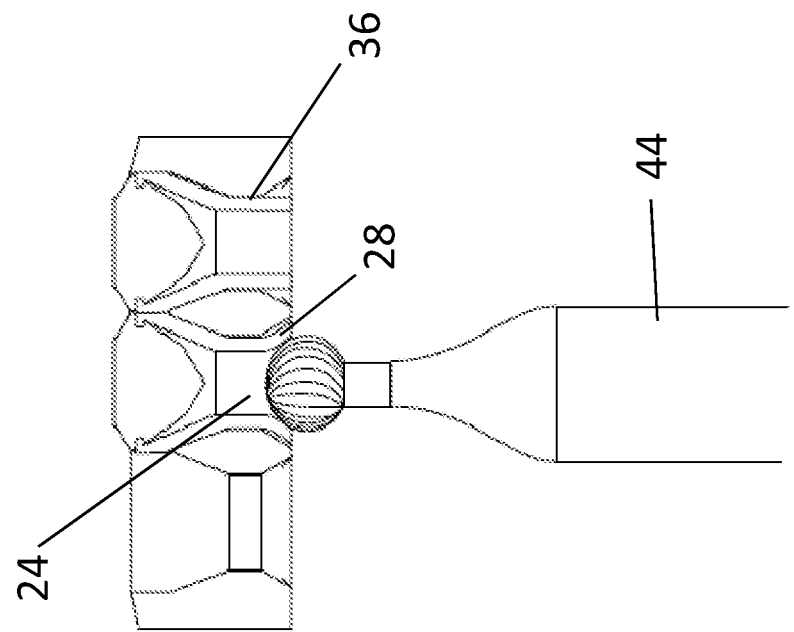
FIG. 4 is a simplified diagram showing use of the deformation tool of FIG. 3 from a direct angle.

FIG. 4 is the same as FIG. 3 but viewed directly from the front so that the deformation of the base 28 of the holder 24 about the opening 36 is more clearly shown.

Figure 5:
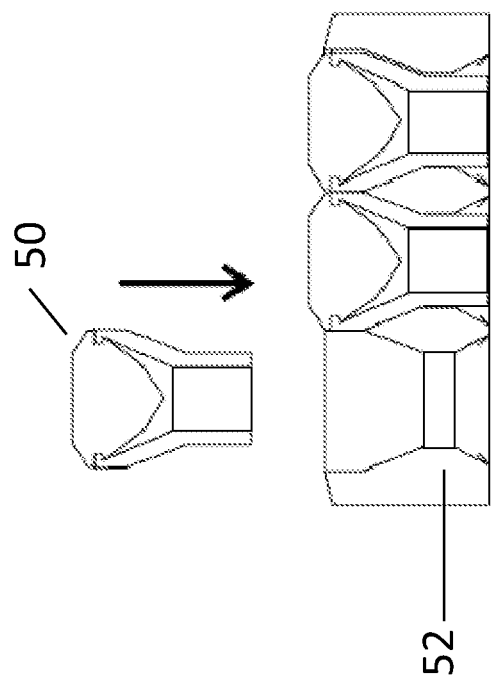
FIG. 5 is a simplified diagram showing a row of mounting according to an embodiment of the present invention.

FIG. 5 shows a mounting 50 with a gemstone being placed downwardly into a space in the setting 52 prior to the deformation shown in FIG. 4. In use, a setting shaped as explained above with spaces for the mountings, is used. A mounting 50 having arms and protrusions at a distal end of the arms, is fitted with a gemstone and is pressed in the direction of arrow 54 when the arms fit into the gemstone grooves as explained above. Simultaneous pressing of the gemstone into the mounting and pushing the mounting into the space provides a single click action in which the pressure causes the contouring on the setting to distort the mounting to simultaneously catch the mounting into the space and press the arms inwardly to lock the protrusions into the gemstone grooves.

Typically gemstones are mounted in rows and columns. Three adjacent mountings are shown in the figure, and once the rows and columns of gemstones are filled, the mounting is invisible to the outside observer.

Figure 6:
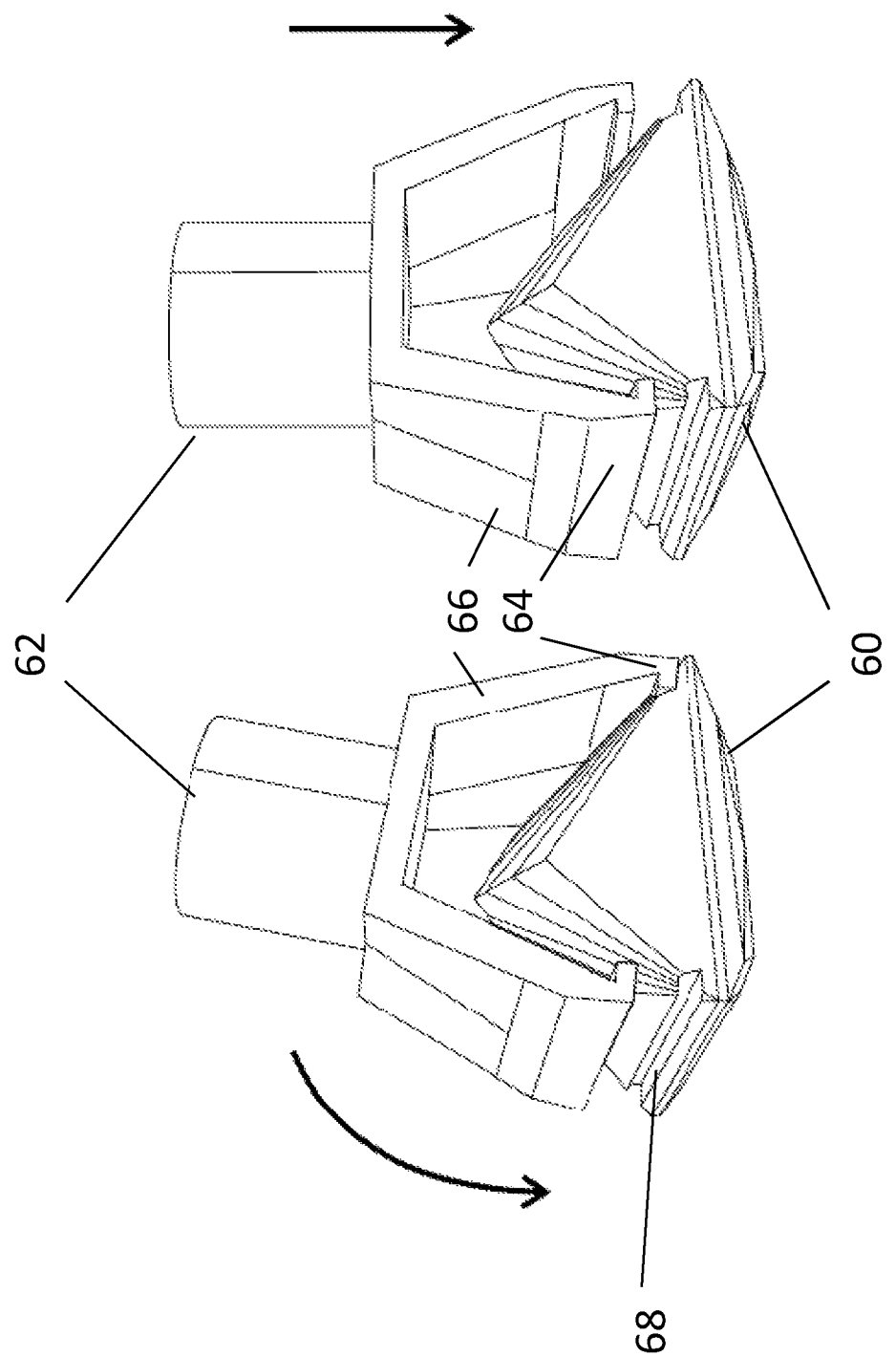
FIG. 6 is simplified diagram showing insertion of a gemstone onto a mounting according to the present embodiments.

Reference is now made to FIG. 6, which illustrates a gemstone 60 being placed in a mounting 62. Typically the gemstone may simply be placed face down on a surface and then the mounting is pressed down onto the gemstone allowing the protrusions 64 at the end of the arms 66 to snap into grooves 68.

Figure 7:
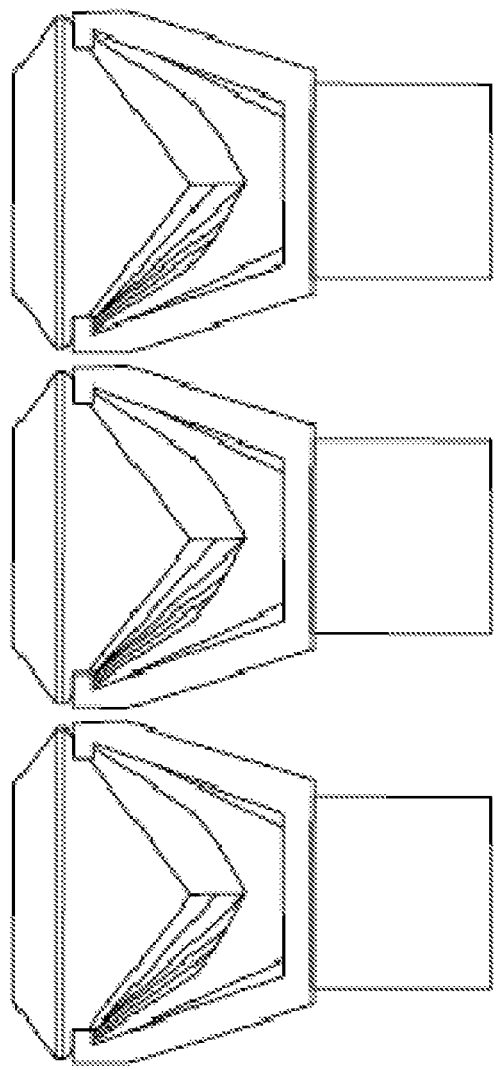
FIG. 7 is a simplified diagram showing a row of three mounted gemstones following the insertion procedure of FIG. 6.

FIG. 7 shows three mounted gemstones in a row.

Figure 8D:
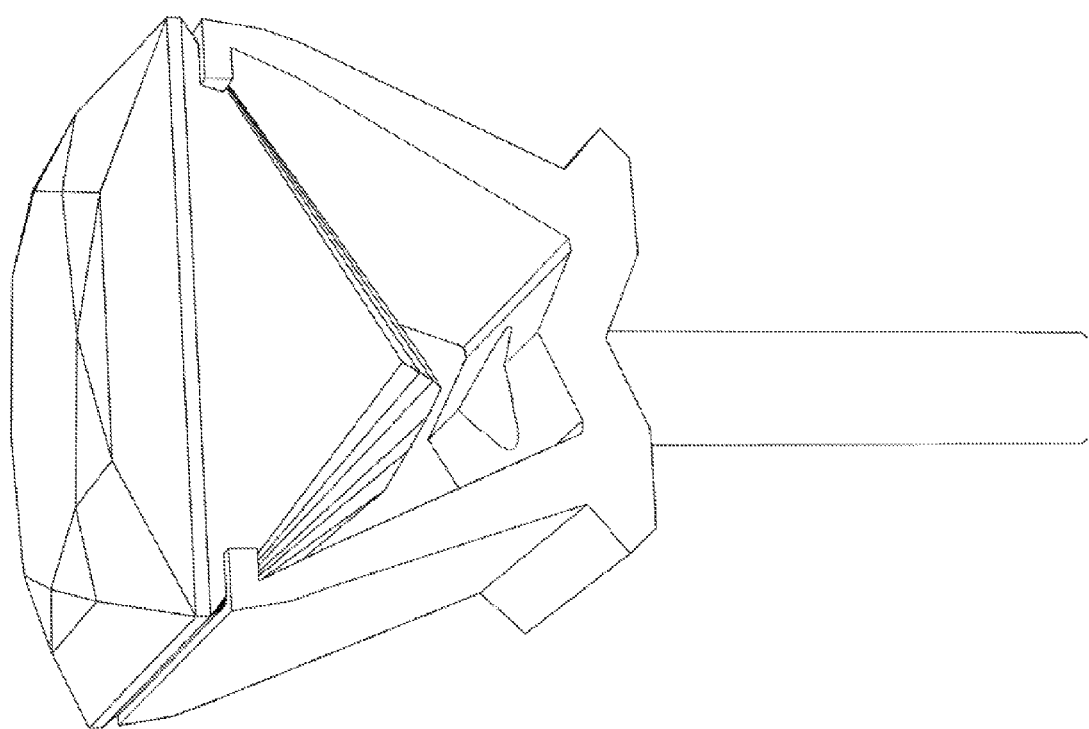

Reference is now made to FIGS. 8A-8D, which are simplified diagrams of a third embodiment of the mounting in which the holder includes a break-off portion to carry out the deformation. Mounting 80, holding gemstone 81, comprises a pole portion 82 at the end of holder 84. The arm arrangement for holding the gemstone is unchanged and the holder 84 works in the same way to bias the arms to hold the gemstone tighter following deformation. As shown in FIG. 8A the mounting is pressed into the space in the setting via contouring 86 on the setting which deforms the mounting as it passes. The mounting 80 is snapped into the setting to the position shown in FIG. 8B and then the pole portion 82 is pulled to deform the holder further by flattening floor 88, initially concave, of the holder 82. The pole portion is broken off during the deformation to leave a clean setting and a holder with a flattened floor 88.

The breakable portion 82 may be designed to be broken off using a shaped mounting tool (not shown).

In either of the above embodiments, the mounting may simultaneously close over the grooved gemstone and deform into the setting with a single application of force.

FIG. 8C illustrates the gemstone in situ on the mounting after the breakable portion 82 has been removed.

Reference is now made to FIGS. 9A-9E, which show stages in the use of a variation of the embodiment of FIG. 8.

In the variation of FIGS. 9A to 9E breakable pole portion 82 is replaced by a removable tool. Removable tool 90 comprises a cylindrical pole portion 92 and a flanged end 94. The cylindrical pole portion 92 fits into a correspondingly shaped hole 96 in concave base portion 98 of mounting 100. FIG. 9A shows the pole over the hole prior to insertion and FIG. 9B shows the pole after insertion with the flanged end pulled against the hole 96. As shown in FIG. 9B the mounting is inverted for insertion of the stone 101 and then as shown in FIG. 9C the mounting with the tool and stone are inserted into the setting 102 with the tool extending through hole 104 in the setting. As shown in FIG. 9D the mounting is pressed into position in the setting and then the tool is pulled from below. The pull from below releases the tool from the mounting, at the same time flattening the concavity of the base portion 98 and levering the arms to push inward on the gemstone.

Figure 9F:
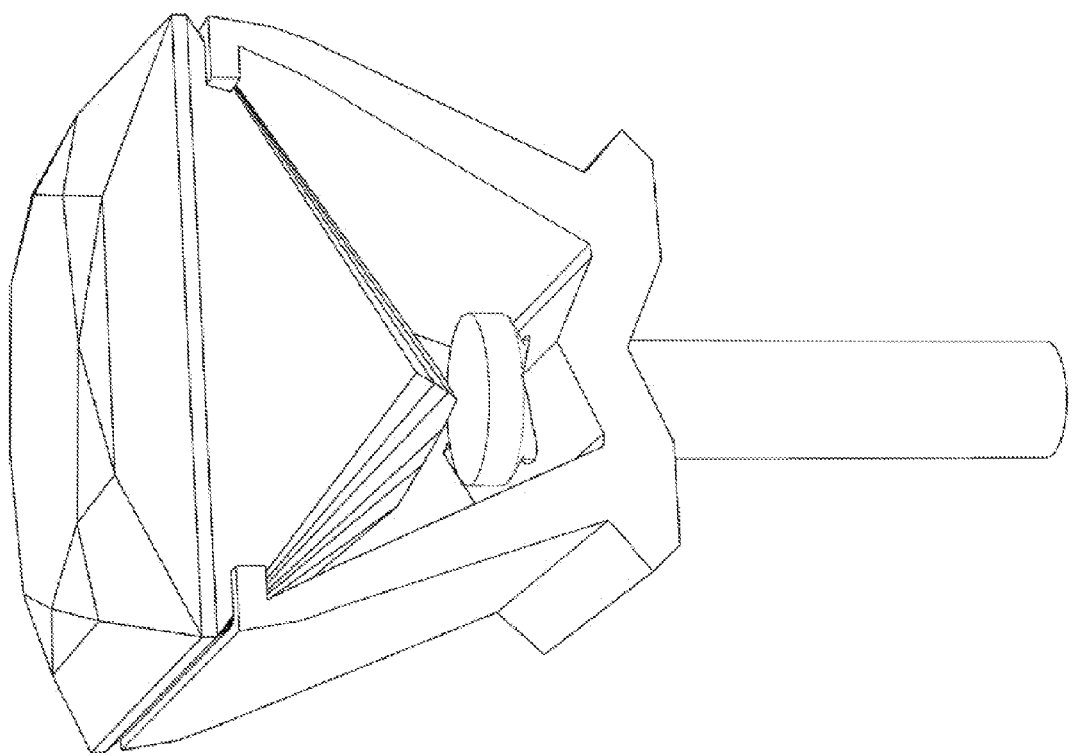

FIG. 9F shows the gemstone in situ with the tool prior to tool removal.

Figure 10:
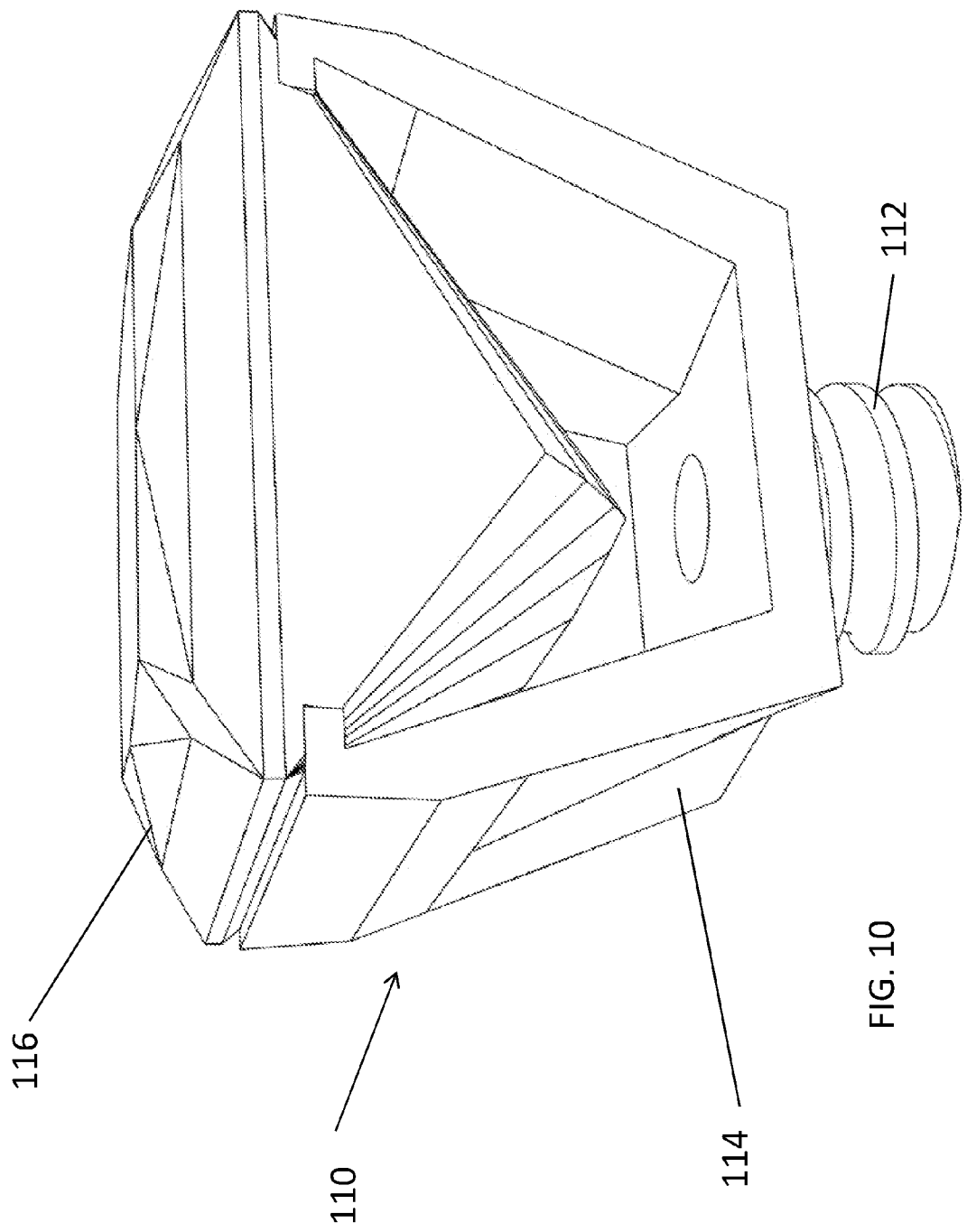
FIG. 10 is a simplified perspective view of a further mounting according to the present embodiments in which a screw-end is provided to the base to allow for an external threaded tool to distort the base to clasp the gemstone.

Reference is now made to FIG. 10, which is a simplified perspective view of a further mounting 110 according to the present embodiments. In FIG. 10, a screw-end 112 is provided to the base 114 of mounting 110 to allow for an external threaded tool to distort the base 114 to clasp the gemstone 116.

Figure 11:
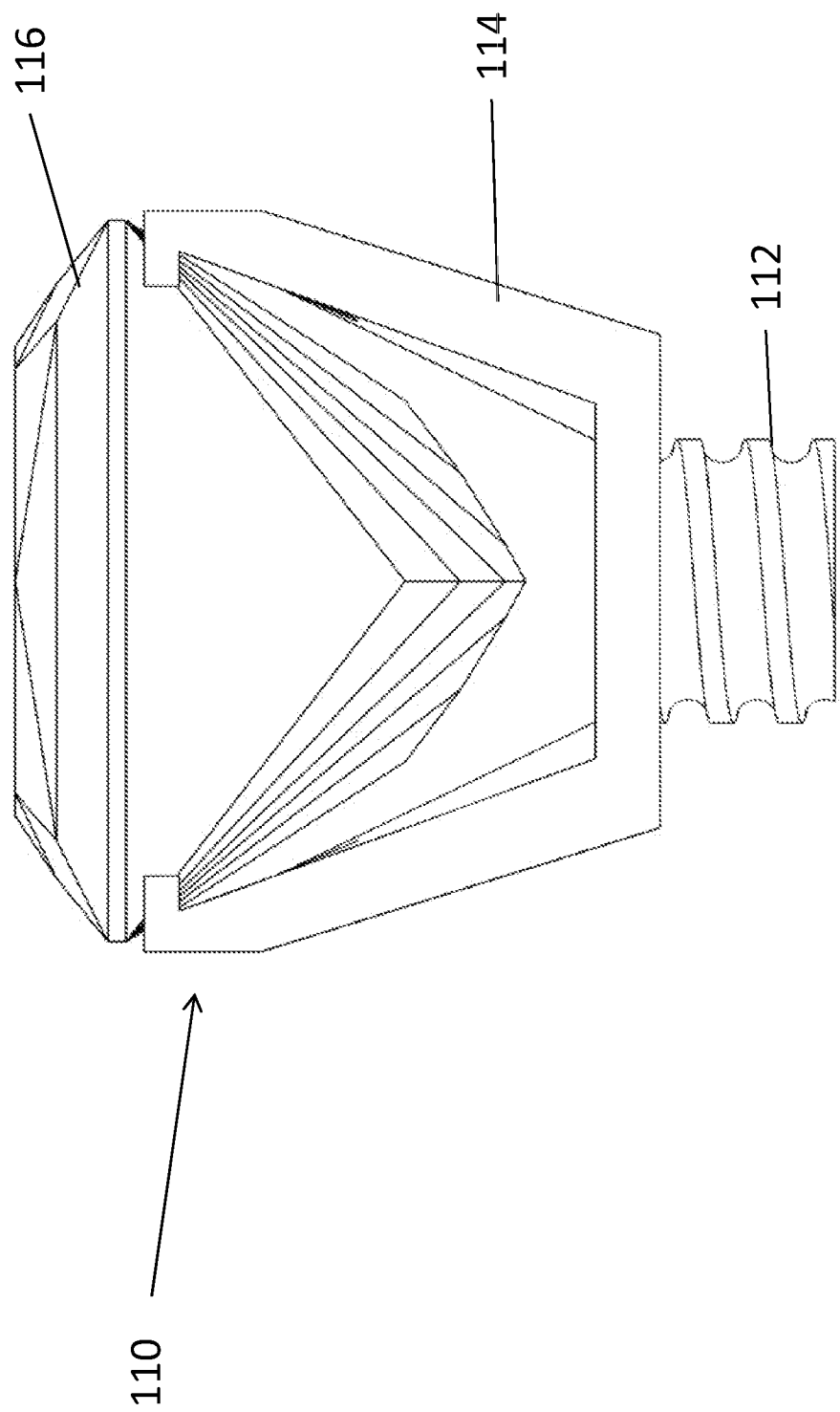
FIG. 11 is a side view of the mounting of FIG. 10.

FIG. 11 is a side view of the mounting of FIG. 10.

FIGS. 12A-12F illustrate succeeding stages in mounting and clasping a gemstone into the mounting of FIG. 10. FIG. 12A shows the holder pressed over the inverted gemstone to snap fit the gemstone from above. FIG. 12B shows the gemstone snapped into the mounting following the snap-fit operation of FIG. 12A.

In FIG. 12C the mounting is lowered in the direction of arrow 118 onto setting 120. In FIG. 12D threaded tool 122 is lined up with the screw-end 112 and in FIG. 12E the screw-end is threaded into the threaded tool to distort base 114 and reinforce the holding of the gemstone by the mounting.

Finally in FIG. 12 the threaded tool is removed from the mounting, which mounting is now firmly held in the setting.

The different embodiments listed herein can be used with automation, such as CNC devices and robot arms. The embodiments of FIGS. 9A to 9F and FIGS. 10-12F are particularly suitable for use with a robot arm.

Embodiments of the present invention may be used with flawed gemstones, and particularly where the flaws in the gemstones are in the region of the grooves cut in the gemstones to carry out the invisible mounting. Generally the flaws are inclusions within the gemstone which weaken the crystal structure and render it mechanically weaker. With prior art mountings gemstones in which the flaws are in the proximity of the grooves are not used simply because the mechanical pressures of the invisible mounting are too much to bear for the lessened mechanical strength of the flaw. However in the present embodiments the substantial mechanical force is directed inwards and thus the support is provided by the body of the gemstone. Hence for the first time it is possible to use gemstones having flaws around the periphery and particularly near the grooves, for invisible mounting.

It is expected that during the life of a patent maturing from this application many relevant pulse shaping and symbol decoding technologies will be developed and the scope of the corresponding terms in the present description are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A setting and a mounting for holding a grooved gemstone invisibly to said setting, the mounting having a first end with extensions to receive the gemstone and protrusions extending inwardly from said extensions to fit within respective mounting grooves of the grooved gemstone, the mounting further comprising a holding configuration at a second end opposite said first end for lockingly holding said mounting to said setting, wherein the holding configuration is connected to said extensions to press said protrusions via said extensions inwardly onto said grooves when said holding configuration is distorted about said setting, wherein said holding configuration is pressed against contouring of said setting.

2. The setting and mounting of claim 1, wherein the mounting is configured to be deformed upon pulling inwardly about contouring on said setting, said deformation being such as to lever said extensions to push said protrusion inwardly into said groove.

3. The setting and mounting of claim 2, comprising a concave base portion being flattenable to provide said deformation.

4. The setting and mounting of claim 3, wherein said flattening is provided by a breakable portion attached to said base portion.

5. The setting and mounting of claim 4, wherein said flattening is provided by a tool inserted via a hole into said base portion.

6. The setting and mounting of claim 1, wherein said holding configuration is configured to protrude at least partially from a base part of said setting, said holding configuration being deformable about said setting by a deformation tool applied to said second end to catch said mounting into said setting and to lever said protrusions into said groove.

7. The setting and mounting of claim 1, wherein said holding configuration is configured to protrude at least partially from a base part of said setting, said holding configuration comprising a breakable portion that deforms said mounting prior to being broken away therefrom, to catch said mounting into said setting and to lever said protrusions into said groove.

8. The setting and mounting of claim 7, wherein said breakable portion is designed to be broken off using a shaped mounting tool.

9. The setting and mounting of claim 1, comprising a weakened portion for preferential deformation when being mounted.

10. The setting and mounting of claim 9, configured to simultaneously close over said grooved gemstone and deform into said setting with a single application of force.

11. The setting and mounting of claim 1, wherein said extensions are resilient.

12. The setting and mounting of claim 1, wherein said holding configuration is configured to undergo distortion when fitting into said setting, said distortion holding said respective mounting to said setting.

13. A setting for gemstones comprising a plurality of locations for holding respective gemstone mountings, each location being shaped to close upper protrusions of a respective one of said gemstone mountings into a groove of a grooved gemstone to hold said gemstone to said setting, the respective gemstone mountings each having a first end with extensions to receive the gemstone and protrusions extending inwardly from said extensions to fit within mounting grooves of the grooved gemstone, the respective gemstone mountings each further comprising a holding configuration at a second end opposite said first end for lockingly holding said mounting to said setting, wherein the holding configuration is connected to said extensions to press said protrusions via said extensions inwardly onto said grooves when said holding configuration is distorted about said setting, wherein said holding configuration is pressed against contouring of said setting, thereby to carry out closing of said upper protrusions.

14. The setting of claim 13, being contoured to push upper parts of respective mountings inwardly to lock onto said groove when said setting is pushed downwardly into said location.

15. The setting of claim 13, wherein respective shapes are open at a lower end to allow a deformable or breakable holding portion of said mounting to extend from said lower end for said deformation or breakage causing said deformation.

16. The setting of claim 15, provided with a tool to carry out said deformation or breakage causing said deformation.

17. The setting of claim 13 wherein said location is shaped to deform said respective mounting to cause said closing.

18. An item of jewelry comprising a setting, a plurality of mountings for mounting gemstones and a plurality of gemstones mounted on said plurality of mountings and invisibly mounted on said setting, whereby said setting and said plurality of mountings are made of different materials, each of said mountings having a first end with extensions to receive a respective gemstone and protrusions extending inwardly from said extensions to fit within respective mounting grooves of the respective gemstone, the mountings further comprising respectively a holding configuration at a second end opposite said first end for lockingly holding said corresponding mounting to said setting, wherein the holding configuration is connected to said extensions to press said protrusions inwardly onto said grooves via said extensions when a respective holding configuration is distorted about said setting, wherein said holding configuration is pressed against contouring of said setting.

19. A mounting for holding a grooved gemstone invisibly to a setting, the mounting having a first end with extensions to receive the gemstone and protrusions extending inwardly from said extensions to fit within respective mounting grooves of the grooved gemstone, the mounting further comprising a holding configuration to securely locate said mounting into a location in said setting, wherein the holding configuration is connected to said extensions to press said protrusions inwardly onto said grooves when said holding configuration is distorted by said secure locating, wherein said holding configuration is pressed against contouring of said setting to cause said distorting.

20. A setting and a mounting for holding a grooved gemstone invisibly to said setting, the mounting having a first end with extensions to receive the gemstone and protrusions extending inwardly from said extensions to fit within respective mounting grooves of the grooved gemstone, the mounting further comprising a holding configuration at a second end opposite said first end for lockingly holding said mounting to said setting, wherein the holding configuration is connected to said extensions to jointly lever said extensions against a setting wall to push said protrusions into said groove on opposite sides of said gemstone, wherein said holding configuration is configured to protrude at least partially from a base part of said setting, said holding configuration being deformable about said setting by a deformation tool applied to said second end to catch said mounting into said setting and to lever said protrusions into said groove.

21. The setting and mounting of claim 20, wherein said holding configuration is configured to protrude at least partially from a base part of said setting, said holding configuration comprising a breakable portion that deforms said mounting prior to being broken away therefrom, to catch said mounting into said setting and to lever said protrusions into said groove.

22. The setting and mounting of claim 20, wherein said breakable portion is designed to be broken off using a shaped mounting tool.

23. The setting and mounting of claim 20, comprising a weakened portion for preferential deformation when being mounted.

24. The setting and mounting of claim 20, configured to simultaneously close over said grooved gemstone and deform into said setting with a single application of force.

25. The setting and mounting of claim 20, comprising a concave base portion being flattenable to provide said deformation.

26. The setting and mounting of claim 25, wherein said flattening is provided by a breakable portion attached to said base portion.

27. The setting and mounting of claim 25, wherein said flattening is provided by a tool inserted via a hole into said base portion.

28. The setting and mounting of claim 20, wherein said extensions are resilient.

* * * * *